(12) United States Patent
Kisaka et al.

(10) Patent No.: US 7,970,008 B2
(45) Date of Patent: Jun. 28, 2011

(54) MULTIPLEXING TRANSMISSION SYSTEM AND MULTIPLEXING TRANSMISSION METHOD

(75) Inventors: Yoshiaki Kisaka, Yokosuka (JP); Shigeki Aisawa, Yokosuka (JP); Tetsuo Takahashi, Yokosuka (JP); Takuya Ohara, Yokosuka (JP); Masafumi Koga, Yokosuka (JP); Masahito Tomizawa, Yokosuka (JP); Yutaka Miyamoto, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 158 days.

(21) Appl. No.: 12/438,056

(22) PCT Filed: Sep. 21, 2007

(86) PCT No.: PCT/JP2007/068409
§ 371 (c)(1),
(2), (4) Date: Feb. 19, 2009

(87) PCT Pub. No.: WO2008/035769
PCT Pub. Date: Mar. 27, 2008

(65) Prior Publication Data
US 2010/0177785 A1 Jul. 15, 2010

(30) Foreign Application Priority Data

Sep. 22, 2006 (JP) .................................. 2006-256783

(51) Int. Cl.
*H04J 3/22* (2006.01)
(52) U.S. Cl. ......................... 370/465; 371/540; 371/543

(58) Field of Classification Search .................. 370/389, 370/391, 392, 465, 466, 538, 540, 543, 544
See application file for complete search history.

(56) References Cited

U.S. PATENT DOCUMENTS

| 4,504,943 | A | 3/1985 | Nagano et al. | |
|---|---|---|---|---|
| 6,650,638 | B1 * | 11/2003 | Walker et al. | 370/389 |
| 7,006,536 | B1 * | 2/2006 | Somashekhar et al. | 370/538 |
| 7,440,513 | B2 * | 10/2008 | Thaler | 375/296 |

(Continued)

FOREIGN PATENT DOCUMENTS

EP 0 982 969 A2 3/2000

(Continued)

OTHER PUBLICATIONS

Aisawa, S. et al., "Photonic network configuration employing G.709 OCh wavelength-path standardized by ITU-T", IEICE Technical Report, vol. 104, No. 80, pp. 53 to 56, (2004), (with English abstract).

(Continued)

*Primary Examiner* — Pankaj Kumar
*Assistant Examiner* — Duc T Duong
(74) *Attorney, Agent, or Firm* — Oblon, Spivak, McClelland, Maier & Neustadt, L.L.P.

(57) ABSTRACT

A multiplexing transmission system for adding a management overhead to a client signal, and transparently accommodating or multiplexing the client signal to transmit it is provided. The multiplexing transmission system: accommodates a plurality of client signals of different bit rates including a client signal of a bit rate that is not an integral multiple or an integral submultiple of a bit rate of other client signal, and performs rate adjustment for a part or the whole of the plurality of client signals such that the bit rate of each client signal becomes an integral multiple or integral submultiple of the bit rate of other client signal.

20 Claims, 13 Drawing Sheets

U.S. PATENT DOCUMENTS

| | | | |
|---|---|---|---|
| 2002/0039211 A1* | 4/2002 | Shen et al. | 359/110 |
| 2003/0016416 A1* | 1/2003 | Wolf | 359/139 |
| 2003/0120799 A1 | 6/2003 | Lahav et al. | |
| 2004/0062277 A1* | 4/2004 | Flavin et al. | 370/474 |
| 2004/0105456 A1 | 6/2004 | Lanzone et al. | |
| 2004/0114638 A1 | 6/2004 | Matsuura et al. | |
| 2006/0212780 A1* | 9/2006 | Ohira et al. | 714/776 |
| 2007/0019687 A1* | 1/2007 | Ruthstein et al. | 370/537 |
| 2007/0116061 A1* | 5/2007 | Meagher et al. | 370/503 |
| 2009/0148161 A1* | 6/2009 | Walker et al. | 398/43 |
| 2010/0080245 A1* | 4/2010 | Kisaka et al. | 370/470 |

FOREIGN PATENT DOCUMENTS

| | | |
|---|---|---|
| EP | 1 246 383 A1 | 10/2002 |
| EP | 0 982 969 A3 | 2/2003 |
| EP | 1 282 250 A1 | 2/2003 |
| JP | 58 33334 | 2/1983 |
| JP | 2002 217940 | 8/2002 |
| JP | 2002 247073 | 8/2002 |
| JP | 2004 517575 | 6/2004 |
| JP | 2004 289326 | 10/2004 |

OTHER PUBLICATIONS

"Interfaces for the optical transport network", International Telecommunication Union, ITU-T G.709/Y.1331, pp. 1-18, (2003).

Ichino, H. et al., "Enhanced Network Signaling for 10 Gigabit Ethernet To Achieve A LAN-WAN Seamless Interface And Its Implementation In The PHY-LSI/Transceiver Module", International Journal of High Speed Electronics and Systems, vol. 15, No. 3, pp. 667-704, (2005).

Sutoh, A. et al., "Study of hitless switching with virtual concatenation technologies", NTT Network Service Systems Laboratories, NTT Corporation, p. 504, (2002), (with partial English translation).

IEICE Technical Report, International Telecommunication Union, ITU-T G.709/Y.1331, pp. 1-118, (2003).

* cited by examiner

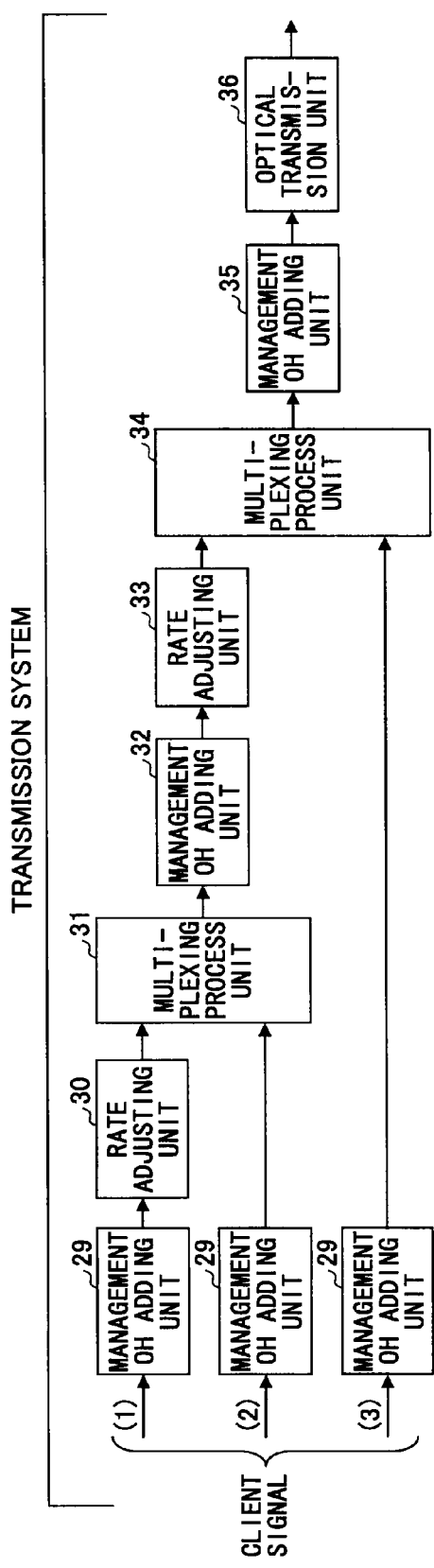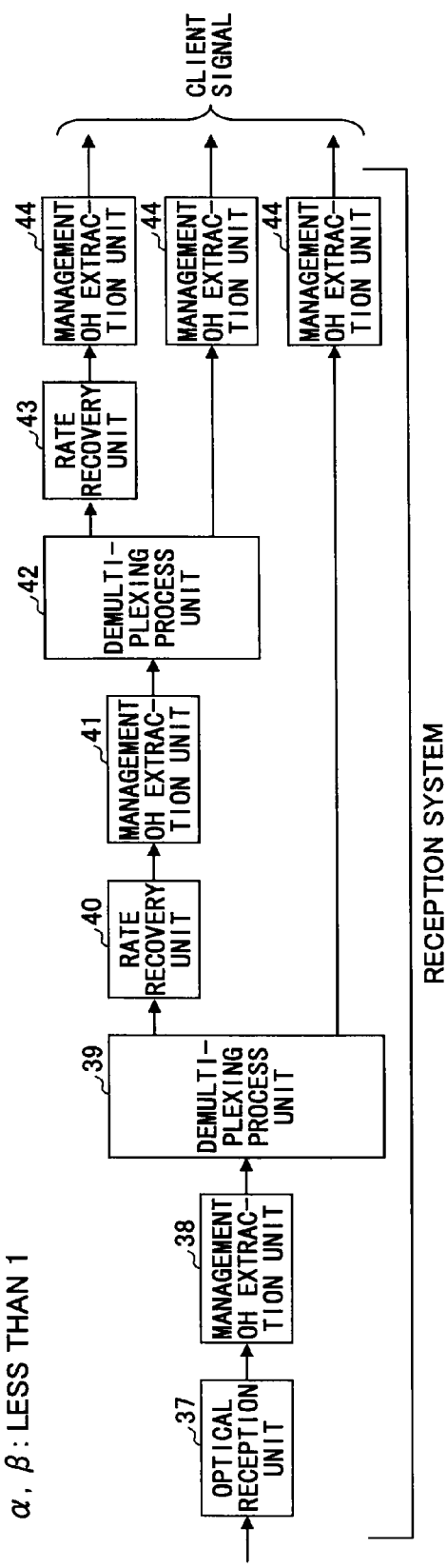
FIG.7
BIT-RATE (1): B
BIT-RATE (2): B × (M+α)
BIT-RATE (3): B × (M+α) × (N+β)
α, β: LESS THAN 1

BIT FOR REPORTING STUFF INFORMATION

BIT FOR STORING DATA WHEN NEGATIVE STUFF

BIT FOR INSERTING STUFF BIT WHEN POSITIVE STUFF

POSITIVE STUFF PROCESS
(WHEN BIT RATE OF CLIENT SIGNAL IS LOWER THAN CLIENT SIGNAL REGION)

INSERT STUFF BIT

NEGATIVE STUFF PROCESS
(WHEN BIT RATE OF CLIENT SIGNAL IS HIGHER THAN CLIENT SIGNAL REGION)

STORE DATA OF CLIENT SIGNAL

MULTIPLEXING TRANSMISSION SYSTEM AND MULTIPLEXING TRANSMISSION METHOD

TECHNICAL FIELD

The present invention relates to an optical transmission system for transparently and efficiently accommodating, multiplexing and transmitting a plurality of client signals which include signals in which bit rates are different with each other and the bit rates are not integral multiples or integral submultiples of each other.

BACKGROUND ART

In an optical transmission system, SDH (Synchronous Digital Hierarchy) is internationally standardized as a digital hierarchy for multiplexing existing service signals. In the United State, SONET (Synchronous Optical Network) similar to SDH is a standard.

Regarding current optical transmission systems, optical transmission systems complying with SONET/SDH specifications are dominating, and the optical transmission systems have been introduced in large quantities in the world so far. In recent years, being based on wavelength-division multiplexing (WDM) that can support explosive increase of the Internet traffic, Optical Transport Network (OTN) (refer to non-patent document 1, for example) is standardized as a platform that transparently transmits various client signals which are not only SDH/SONET but also ATM and Ethernet (registered trademark) and the like, and it is expected that the Optical Transport Network (OTN) will become the mainstream of optical transmission systems in the future.

Client signals of SONET/SDH and OTN are predicated on SONET/SDH signals. As bit rates of client signals of OTN, 2.488, 9.953, and 39.813 Gbit/s are defined in which the number increases in multiples of four.

However, bit rates of Ethernet signals which are being explosively widespread in recent years do not increase in multiples of four. In addition, the bit rates do not increase in multiples of an integral number. The signal of 1 Gigabit Ethernet (1 GbE) is 1.25 Gbit/s, and 10 Gigabit Ethernet (10 GbE) LAN-PHY signal is 10.3125 Gbit/s.

In the future, it is expected that 10 GbE becomes the mainstream as client signals of communication carriers. In addition, demands for connecting LAN environments, as they are, scattered over remote locations by using LAN-PHY are increasing. Further, as to the Ethernet signal, there are users and device vendors using the preamble and the inter-frame gap (IFG) based on proprietary specifications that are different from the IEEE standard (refer to non-patent document 2, for example).

Therefore, in carrier networks, for some Ethernet signals in which the bit rates are not integral multiples of each other, it is required to transparently transfer the whole of the signal including the preamble and the IFG other than the frame.

As a technique for transparently accommodating high speed data signals such as GbE into the SONET/SDH or the OTN network to transmit the signals, there is a virtual concatenation technique that can flexibly change bands. For realizing high reliability also for the high speed data signals of the Gbit/s class, a hitless switching apparatus that can support high speed signals using virtual concatenation is actually used (non-patent document 3, for example).

FIG. 1 shows an example of a transmission system of a conventional technology. The client signals are distributed into SDH virtual containers (VC-3/4) each of which forms a multi-frame using H4 byte in the SDH path overhead. Each VC signal is branched off by the transmission unit 1. The branched VC signals are transmitted by an active transmission route and an auxiliary transmission route. The reception unit 2 performs delay adjustment for signals using the multi-frame in the active route and the auxiliary route so as to select one of them.

Further, in the reception side, the order of VC signals are recognized by using multi-frame counter values to recover the original client signal. In addition, in the transmission system shown in FIG. 1, by accommodating the SDH signal generated using the virtual concatenation into OTN, it becomes possible to transfer the signals by OTN. Accordingly, high speed signals including 10 GbE-LAN-PHY can be flexibly accommodated so as to be transparently transferred.

[Non Patent document 1] ITU-T G.709

[Non Patent document 2] Haruhiko Ichino, Kazuhiko Terada, Kenji Kawai, Osamu Ishida, Keishi Kishine, Noboru Iwasaki, "ENHANCED NETWORK SIGNALING FOR 10 GIGABIT ETHERNET TO ACHIEVE A LAN-WAN SEAMLESS INTERFACE AND ITS IMPLEMENTATION IN THE PHY-LSI/TRANSCEIVER MODULE", International Journal of High-Speed Electronics and Systems, Vol. 15, No. 3 (2005)667-704, World Scientific Publishing Company

[Non Patent document 3] ATSUSHI SUDO, KAZUHIRO ODA, IEICE general conference, B-10-67, 2002

DISCLOSURE OF THE INVENTION

Problem to be Solved by the Invention

In the SONET/SDH or OTN system by which carrier networks are constructed, bit rates of client signals are predicated on bit rates of the SONET/SDH group. The bit rate of the 10 GbE-LAN-PHY signal is 10.3125 Gbit/s which is higher than 9.95328 Gbit/s of SONET/SDH.

Therefore, in the case when transparently accommodating the 10 GbE-LAN-PHY signal using the virtual concatenation technology, the 10 GbE-LAN-PHY signal cannot be accommodated in the 10.7 Gbit/s OTN signal in a carrier wavelength multiplexing network and it is necessary to use a plurality of wavelengths. In addition, even when using a 43.0 Gbit/s OTN signal, only three 10 GbE-LAN-PHY signals can be accommodated.

Therefore, use efficiency of wavelength resources in the carrier network decreases. In addition, in the carrier network, since it is desired to realize transparent transfer of the Ethernet signals economically, it is desirable to transparently accommodate and multiplex not only 10 GbE signals but also 1 GbE signals so as to increase accommodated client signals per one wavelength.

An object of the present invention is to realize an optical transmission system that can efficiently accommodate, multiplex and transmit a plurality of client signals, such as 1 GbE and 10 GbE and the like, in which bit rates are different with each other and the bit rates are not integral multiples or integral submultiples of each other.

Means for Solving the Problem

For achieving the above object, the present invention is configured as a multiplexing transmission system for adding a management overhead to a client signal, and transparently accommodating or multiplexing the client signal to transmit it, wherein the multiplexing transmission system:

accommodates a plurality of client signals of different bit rates including a client signal of a bit rate that is not an integral multiple or an integral submultiple of a bit rate of other client signal, and performs rate adjustment for a part or the whole of the plurality of client signals such that the bit rate of each client signal becomes an integral multiple or integral submultiple of the bit rate of other client signal.

Accordingly, by performing bit rate adjustment such that bit rates of the client signals become integral multiples or integral submultiples of each other, multiplexing becomes possible so that a plurality of client signal of different bit rates can be flexibly accommodated.

For example, when the client signals are the 1 GbE signal and the 10 GbE signal, the 1 GbE signal is 1.25 Gbit/s and the 10 GbE signal is 10.3125 Gbit/s, so the bit rates are not integral multiples of each other. By performing rate adjustment of 66/64 for the 1 GbE signal, the bit rate of the 1 GbE signal becomes the same as a bit rate of ⅛ of the bit rate of the 10 GbE signal, so that time-division 8 multiplexing can be realized using a simple configuration.

For example, the multiplexing transmission system performs the rate adjustment before adding the management overhead. By performing the rate adjustment before adding the management overhead, bit rates of signals in which the management overhead is added to each client signal become integral multiples of each other, so that a simple multiplexing configuration can be realized.

Or, the multiplexing transmission system can perform the rate adjustment for the part or the whole of signals to which the management overhead is added when multiplexing the signals to which the management overhead is added. At this time, when multiplexing low rate client signals into a high rate client signal of higher bit rate, the multiplexing transmission system may perform rate adjustment such that a bit rate of a multiplexed signal obtained by multiplexing signals each being the low rate client signal to which a management overhead is added agrees with a bit rate of a signal obtained by adding a management overhead to the high rate client signal.

Accordingly, by performing bit rate adjustment only when performing multiplexing, bit rate of a signal for which multiplexing is not performed can be kept low, so that a margin for system hardware and transmission characteristics can be enlarged.

Or, the multiplexing transmission system can increase the management overhead added to the high rate client signal by the amount of the management overhead added to the low rate client signals.

By increasing the management overhead added to the high rate client signal, bit rates agrees between a signal obtained by adding a management overhead to a multiplexed signal of low rate client signals to which management overhead is added, and a signal obtained by adding a management overhead to the high rate client signal, so that the signals of either accommodation method can be treated as the same bit rate. Further, it becomes possible to perform transparent multiplexing including the management overhead of the low rate client signal.

According to the embodiments of the present invention, the multiplexing transmission system can accommodate, as the client signals, a plurality of client signals including a 1 Gigabit Ethernet signal or a 10 Gigabit Ethernet signal. That is, the multiplexing transmission system can transparently accommodate and multiplex the 1 Gigabit Ethernet signal and the 10 Gigabit Ethernet signal, at the same time, that are the mainstream as the high speed data interface At this time, the multiplexing transmission system can accommodate, as the client signals, client signals of a bit rate of 103.125 Gbit/s. Accordingly, by accommodating, as the client signal, the signal having a bit rate of 10 times of the 10 Gigabit Ethernet signal, it becomes possible to realize multiplexing between 10 Gigabit Ethernet signals and the 103.125 Gbit/s signal with a simple configuration.

In addition, the multiplexing transmission system may accommodate, as the client signals, client signals of a bit rate of 41.25 Gbit/s. By accommodating the signal having a bit rate of 4 times of the 10 Gigabit Ethernet signal, it becomes easy to realize multiplexing between 10 Gigabit Ethernet signals and the 41.25 Gbit/s signal. In addition, since 41.25 Gbit/s is 2.5 times of 103.125 Gbit/s, two 41.25 Gbit/s signals and two-multiplexed 10 Gigabit Ethernet signals can be multiplexed and accommodated.

In addition, the multiplexing transmission system can generate, as a transmission frame including the management overhead, a transmission frame complying with an OTU1 frame structure when directly accommodating the 1 Gigabit Ethernet signal, generate a transmission frame complying with an OTU2 frame structure when directly accommodating the 10 Gigabit. Ethernet signal, and generate a transmission frame of a bit rate of 111.4274364 Gbit/s complying with an OTU3 frame structure when directly accommodating a client signal of 103.125 Gbit/s. In addition, the multiplexing transmission system may include means configured to multiplex 1 Gigabit Ethernet signals and 10 Gigabit Ether signals into transmission frames of higher bit rate respectively.

Accordingly, by applying the OTUk frame and the multiplexing process that are the ITU-T standard, Ethernet signals can be transparently accommodated and multiplexed while maintaining compatibility with OTN operation and management of the ITU-T standard.

In addition, the multiplexing transmission system may be configured such that the multiplexing transmission system generates, as a transmission frame including the management overhead, a transmission frame complying with an OTU1 frame structure when directly accommodating the 1 Gigabit Ethernet signal, when directly accommodating the 10 Gigabit Ethernet signal as the client signal, the multiplexing transmission system accommodates the client signal into OPU2 after rate adjustment of the client signal by 238/237 times to generate a transmission frame complying with an OTU2 frame structure, when accommodating a client signal of 41.25 Gbit/s, the multiplexing transmission system accommodates the client signal into OPU3 after rate adjustment of the client signal by 238/236 times to generate a transmission frame complying with an OTU3 frame structure, and when accommodating a client signal of 103.125 Gbit/s, the multiplexing transmission system accommodates the client signal into OPU frame after rate adjustment of the client signal by 15232/15009 times to generate a transmission frame of a bit rate of 112.133 Gbit/s complying with an OTU frame structure. Accordingly, it becomes possible to transparently accommodate and multiplex Ethernet signals of each rate, and maintain ability of OTN operation and management of the ITU-T standard.

In addition, the multiplexing transmission system may be configured such that the multiplexing transmission system generates, as a transmission frame including the management overhead, a transmission frame complying with an OTU1 frame structure when directly accommodating the 1 Gigabit Ethernet signal, when directly accommodating the 10 Gigabit Ethernet signal as the client signal, the multiplexing transmission system accommodates the client signal into OPU2 after rate adjustment of the client signal by 238/237 times to generate a transmission frame complying with an OTU2 frame structure, when accommodating a client signal of 41.25 Gbit/s, the multiplexing transmission system accommodates the client signal into OPU3 after rate adjustment of the client signal by 238/236 times to generate a transmission frame complying with an OTU3 frame structure, and when accommodating a client signal of 103.125 Gbit/s, the multiplexing transmission system accommodates the client signal into OPU frame after rate adjustment of the client signal by 476/469 times to generate a transmission frame of a bit rate of 112.140 Gbit/s complying with an OTU frame structure. Accordingly, it becomes possible to transparently accommodate and multiplex Ethernet signals of each rate, and maintain ability of OTN operation and management of the ITU-T standard.

In addition, the multiplexing transmission system can accommodate SONET/SDH signals as the client signals. Accordingly, by accommodating SONET/SDH signals together that are the interface which is the current mainstream in carrier networks, it can be expected that the application range will be largely enlarged. In addition, the multiplexing transmission system can also accommodate ODU signals as the client signals.

In addition, the multiplexing transmission system can use 64B/66B coding for the 1 Gigabit Ethernet signal as the rate adjustment. Since the 64B/66B coding is used in the physical layer of the 10 Gigabit Ethernet and the coding circuit is widely used, the bit rate of the 1 Gigabit Ethernet signal can be converted to ⅛ of the 10 Gigabit Ethernet signal at low cost.

Further, the multiplexing transmission system can perform frequency synchronization for the client signal by defining a bit for stuff information notification and a bit for storing data when negative stuff in the management overhead, and defining a bit for inserting stuff bit when positive stuff in a client signal accommodating region.

Accordingly, by providing the frequency synchronization function for the client signal, signals from an apparatus that is not in synchronization with the network can be also accommodated and multiplexed.

In addition, the multiplexing transmission system can perform rate adjustment such that bit rates agree with each other or bit rates become integral multiples or integral submultiples of each other within a permitted range of the frequency synchronization.

Even in a case where it is necessary to perform frequency dividing and multiplying using very large values for setting bit rates of client signals to be integral multiples strictly, by providing a range for the bit rates after rate adjustment, multiplexing can be realized by decreasing the ratio of frequency dividing and the ratio of frequency multiplying.

In addition, the present invention can be configured as a multiplexing transmission method for adding a management overhead to a client signal, and transparently accommodating or multiplexing the client signal to transmit it, including:

accommodating a plurality of client signals of different bit rates including a client signal of a bit rate that is not an integral multiple or an integral submultiple of a bit rate of other client signal, and performing rate adjustment for a part or the whole of the plurality of client signals such that the bit rate of each client signal becomes an integral multiple or integral submultiple of the bit rate of other client signal.

Effect of the Invention

According to the present invention, an optical transmission system that can efficiently accommodate, multiplex and transmit a plurality of client signals such as 1 GbE and 10 GbE in which bit rates are not integral multiples of each other can be realized.

BRIEF DESCRIPTION OF THE DRAWINGS

FIG. 7 is a configuration diagram of a fourth embodiment.

EXPLANATION OF REFERENCE SIGNS

Figure 1:
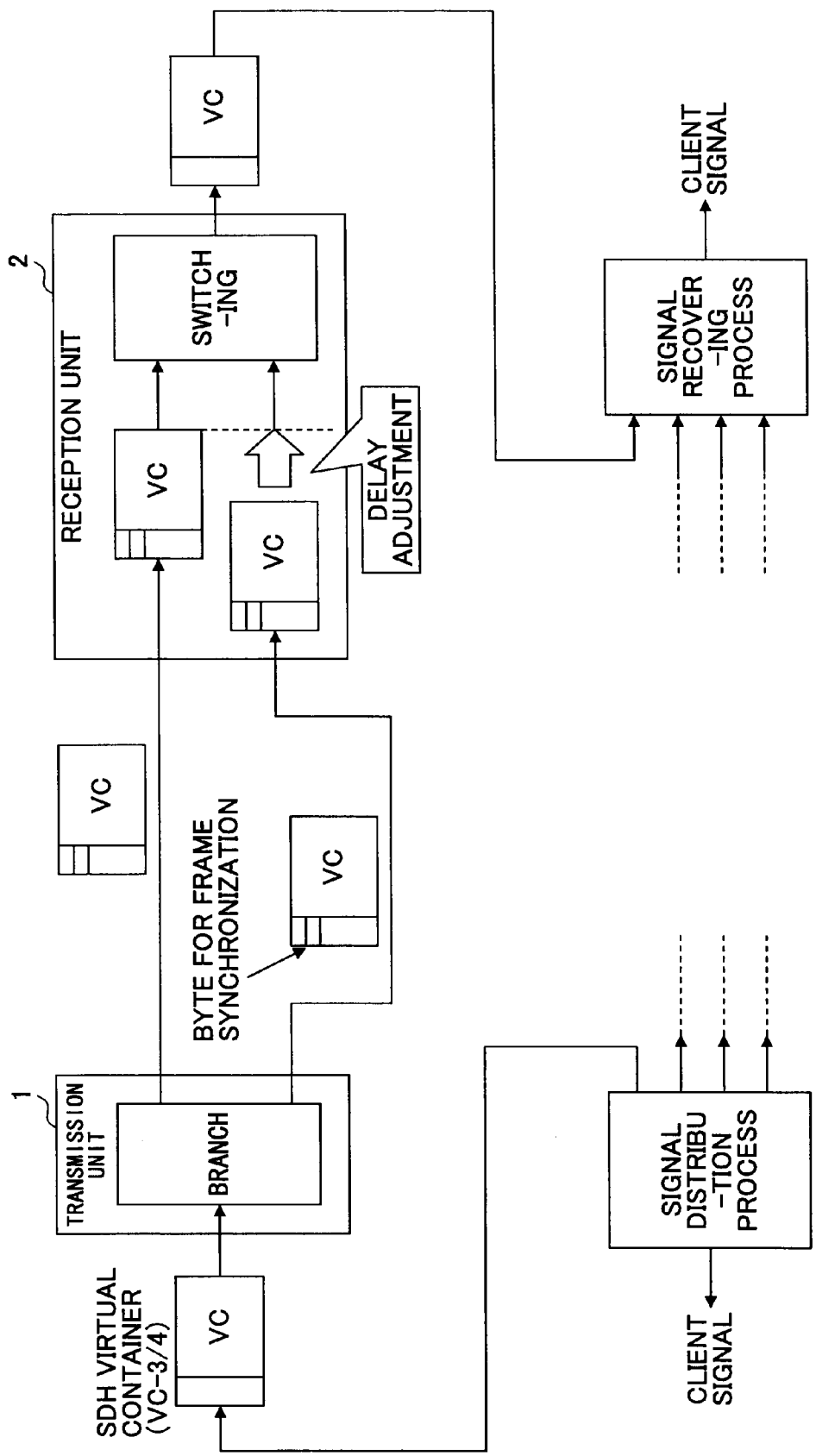
FIG. 1 is a configuration diagram of a conventional technique.

1 transmission unit
2 reception unit
3, 27, 30, 33 rate adjusting unit
4, 12, 14, 16, 17, 29, 32, 35, 45 management OH adding unit
5, 13, 15, 31, 34 multiplexing process unit
6, 36 optical transmitter
7, 37 optical receiver
8, 39, 42 demultiplexing process unit
9, 20, 22, 24, 26, 38, 41, 44 management OH extraction unit
10, 28, 40, 43 rate recovery unit
11, 46 64B/66B coding unit
18 optical signal transmission unit
19 optical signal reception unit
21, 23 demultiplexing process unit
25 64B/66B decoding unit

PREFERRED EMBODIMENTS FOR CARRYING OUT THE INVENTION

First Embodiment

Figure 2:
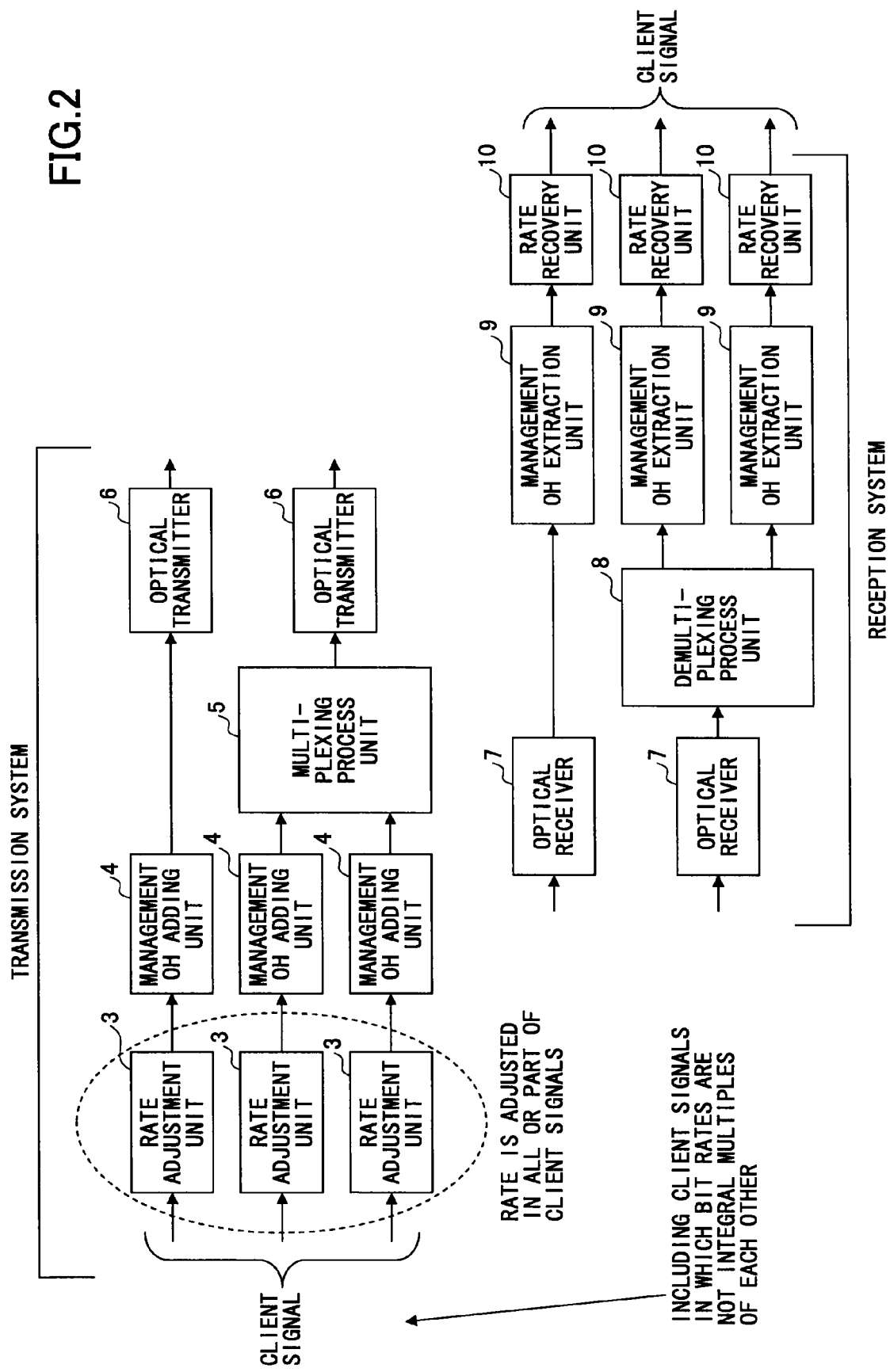
FIG. 2 is a configuration diagram of a first embodiment.

FIG. 2 shows a first embodiment of the present invention. The optical transmission system shown in FIG. 2 includes a transmission system and a reception system. These are connected by an optical transmission network. Each of the transmission system and the reception system may be configured by one apparatus, or may be configured by a plurality of apparatuses. These points also apply to other embodiments.

As shown in FIG. 2, each of the transmission system and the reception system includes a system (upper side of the figure) for accommodating client signals and transmitting them as optical signals without multiplexing them and a system (lower side of the figure) for accommodating client signals and transmitting them as optical signals by multiplexing them.

When performing multiplexing, the rate adjusting units 3 perform rate adjustment for a plurality of client signals in which bit rates are not integral multiples of each other such that the bit rates become integral multiples of each other. In FIG. 2, although rate adjustment is performed for all client signals, the rate adjustment may be performed for a part of the signals.

The management overhead (to be referred to as OH hereinafter) adding unit 4 adds a management OH to the signal that has been rate-adjusted by the rate adjusting unit 3. After the multiplexing process unit 5 performs a multiplexing process on the signal to which the management OH is added, an optical transmitter 6 converts the signal on which multiplexing process has been performed to an optical signal to transmit it. In the reception side, the optical receiver 7 converts the received optical signal into an electrical signal, and the demultiplexing process unit 8 performs a demultiplexing process. The management OH extraction unit 9 performs a termination process on the management OH, and a rate recovering unit 10 performs rate recovering for recovering the original client signal from the rate adjusted signal adjusted in the transmission side so as to output a rate recovered signal. By the way, the management OH complies with OTN, for example.

In the example shown in FIG. 2, even when multiplexing is not performed, rate adjustment is performed such that the bit rate becomes integral multiple of a bit rate of other assumed client signal, and the rate adjusted signal is transmitted as an optical signal by adding the management OH. The reception side terminates the management OH of the received signal to output it by performing rate recovery.

By performing rate adjustment even when multiplexing is not performed so that the bit rate becomes the same as the bit rate obtained when performing multiplexing, bit rates in the apparatus can be integrated so that a simple configuration can be realized. According to the accommodation and multiplexing method of the client signals, a plurality of client signals in which bit rates are not integral multiples or integral submultiples of each other can be accommodated, multiplexed and transmitted.

Second Embodiment

Figure 3:
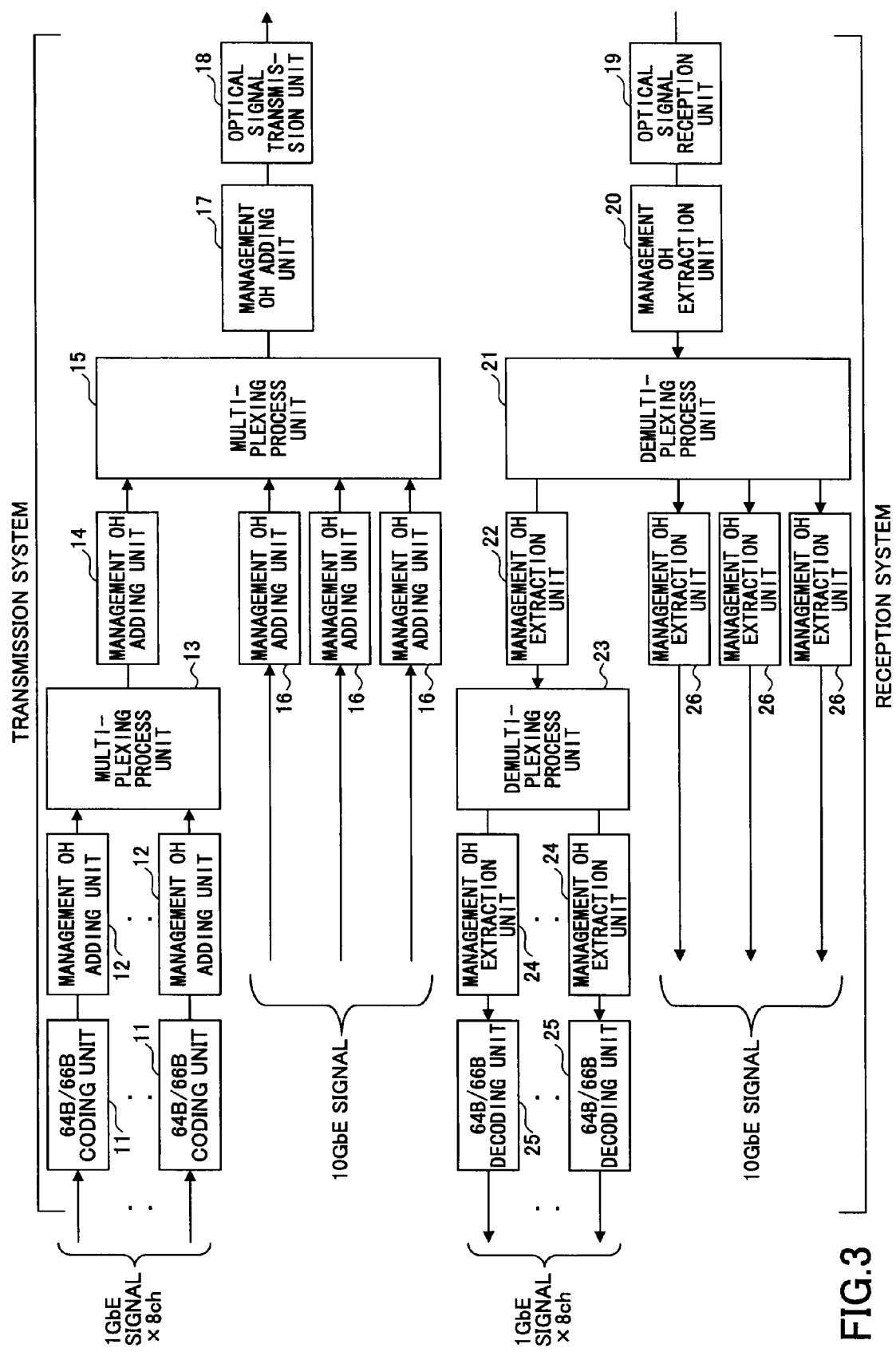
FIG. 3 is a configuration diagram of a second embodiment.

FIG. 3 shows a second embodiment of the present invention. FIG. 3 shows an example of a system for multiplexing and transmitting eight 1 GbE signals and three 10 GbE signals as client signals. In the transmission side, first, the 64B/66B coding unit 11 performs coding for the signal of 1 GbE of the client signal such that the bit rate becomes 66/64 (64B/66B coding, for example) so that bit rate adjustment is performed, and the management OH adding unit 12 adds a management OH to the signal for which bit rate has been adjusted.

As a result of coding in the 64B/66B coding unit 11, 1 GbE signal of 1.25 Gbit/s becomes 1.25×66/64 Gbit/s which is ⅛ of 10.3125 Gbit/s of the 10 GbE signal. Since the bit rate becomes integral submultiple of that of the 10 GbE signal, time division multiplexing process can be performed easily.

The coded 1 GbE signals to which the management OH is added are eight-multiplexed by the multiplexing process unit 13, and a management OH for the multiplexed signal is added by the management OH adding unit 14. On the other hand, a management OH is added to each 10 GbE signal by the management OH adding unit 16. In the process, the bit rate of the signal obtained by adding the management OH to the 10 GbE signal is made to agree with the bit rate of the signal obtained by multiplexing 1 GbE signals and adding the management OH, so as to be able to perform time division multiplexing for both signals. The multiplexing process unit 15 multiplexes both signals to obtain a signal, and the management OH adding unit 17 add a management OH to the signal, so that the optical signal transmission unit 18 transmits the signal as an optical signal.

In the reception side, in reverse processes of the multiplexing side, the optical signal reception unit 19 receives the optical signal, the management OH extraction units 20, 22, 24 and 26, and the demultiplexing process units 21 and 23 perform termination of the management OH and signal demultiplexing process, and after that, the 64B/66B decoding unit 25 performs decoding so as to output each client signal.

As mentioned above, by performing alarm transfer and performance monitoring by adding the management OH in units of client signals and in units of multiplexed signals, fault location is easy to be done when a failure occurs.

Figure 4:
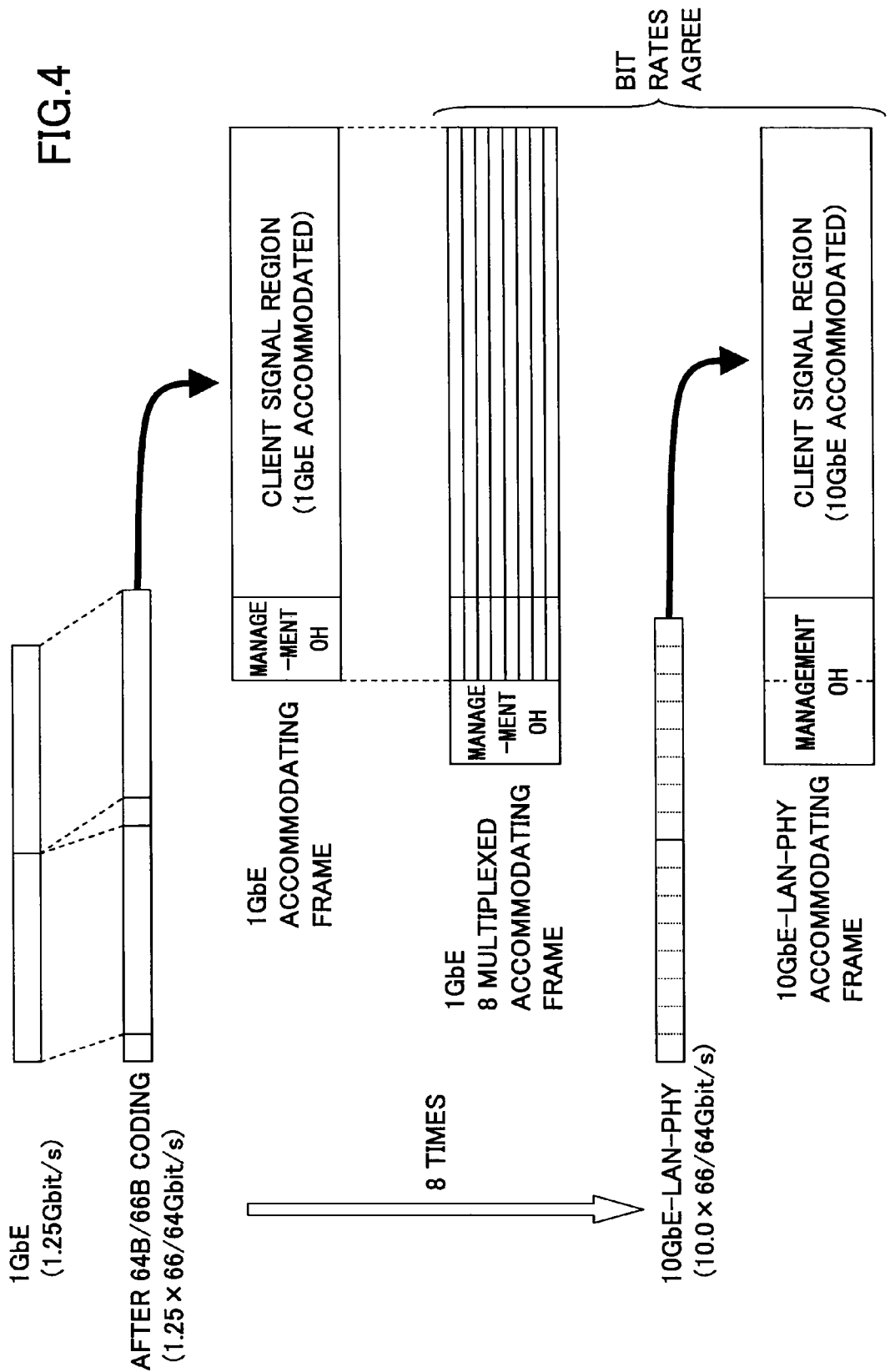
FIG. 4 is a diagram showing a frame configuration example in the second embodiment.

FIG. 4 shows frame configuration examples in multiplexing in the second embodiment. 64B/66B coding is performed for a 1 GbE signal and a management OH is added so that a frame is generated. Eight frames each including the 1 GbE signal are multiplexed, and a management OH is added. The ratios of these two kinds of management OH to each corresponding payload area are made to be the same.

On the other hand, a management OH is added to the 10 GbE signal so that a frame is formed. The management OH added here is set such that the ratio of this management OH to a corresponding payload region is the same as the ratio of the two-added management OH for accommodating 1 GbE signals to a corresponding payload region. A fixed pattern may be inserted into an OH region that is increased compared with OH region for accommodating the 1 GbE signal. By adding such a management OH, the bit rate of the 1 GbE 8 multiplexing accommodating frame agrees with the bit rate of 10 GbE accommodating frame, so that it becomes possible to perform multiplexing process as a unit.

Figure 5:
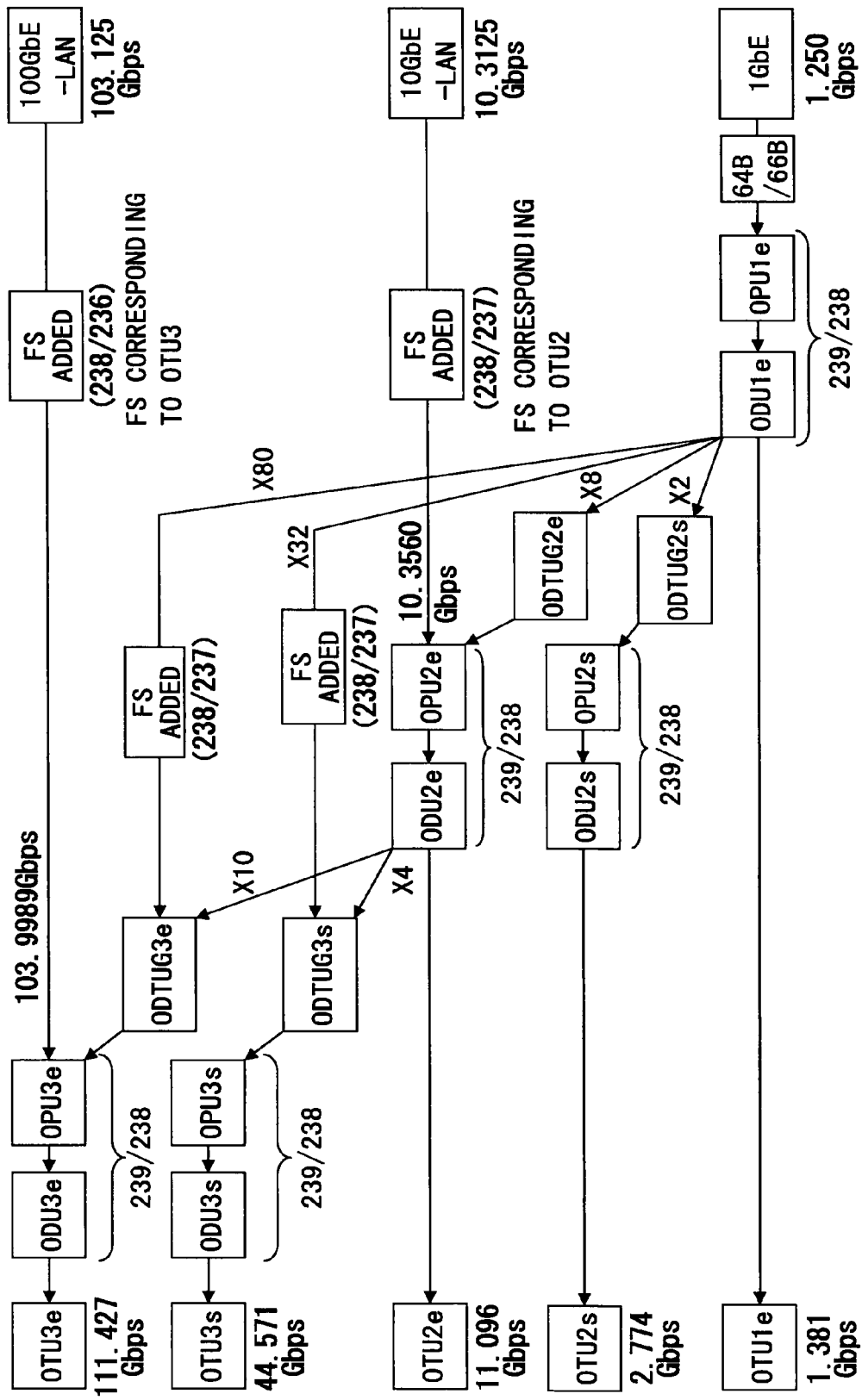
FIG. 5 is a diagram showing an example of multiplexing paths including the second embodiment.

FIG. 5 shows an example of multiplexing paths including the second embodiment. In this example, multiplexing paths are shown in which an OTN frame structure that is defined in ITU-T G.709 is used as accommodating frames, and 1 GbE (1.250 Gbps), 10 GbE (10.3125 Gbps) and 100 GbE (103.125 Gbps) are accommodated and multiplexed as client signals. Currently, since 100 GbE is not standardized, a case is shown in which code used in a physical layer of the 100 GbE signal is the 64B/66B code same as the 10 GbE signal.

In addition, in the example of FIG. 5, OPU (Optical Channel Payload Unit), ODU (Optical Channel Data Unit), OTU (Optical Channel Transport Unit) and ODTUG (Optical Channel Data Tributary Unit Group) frames complying with bit rates of Ethernet signals are represented as OPUe, ODUe, OTUe and ODTUGe respectively, and frames around 2.5 Gbit/s and 40 Gbit/s of bit rates of OTN that accommodate SONET/SDH are represented as OPUs, ODUs, OTUs and ODTUGs.

Basically, in signal multiplexing in OTN, the client signal is mapped to OPU, and an overhead is added so that ODU is made. When multiplexing of the ODUs is not performed, an overhead is added to ODU so that OTU is formed. When multiplexing ODUs, ODTUG in which a plurality of ODUs are multiplexed is generated, ODTUG is mapped to OPU, an overhead is added so that ODU is generated, further, an overhead is added so that OTU is generated.

As shown in FIG. 5, paths are set for accommodating client signals of different bit rates into OPUe, ODUe and OTUe without multiplexing. That is, in the example shown in FIG. 5, the transmission system in the optical transmission system in the first or second embodiment generates a transmission frame complying with the OTU1 frame structure when directly accommodating 1 Gigabit Ethernet signal, the transmission system generates a transmission frame complying with the OTU2 frame structure when directly accommodating 10 Gigabit Ethernet signal, and the transmission system generates a transmission frame having a bit rate of 111.4274364 Gbit/s complying with the OTU3 frame structure when directly accommodating 103.125 Gbit/s client signal.

As a method for increasing the ratio of the management overhead added when accommodating a higher rate client signal to be greater than that when accommodating a low rate client signal, a fixed pattern called Fixed Stuff (FS) byte is inserted. The fraction number (238/236, for example) in FIG. 5 shows a ratio of increase of bit rate by adding FS.

In addition, as shown in FIG. 5, it is also possible to multiplex ODUes in which a low rate client signal is accommodated into a frame of higher bit rate. In FIG. 5 "x" indicates a number of ODUs. For example, FIG. 5 shows multiplexing 80 ODU1es each being rate adjusted and accommodating 1 GbE signal, and shows generating ODTUG3e by adding FS of 238/237, and generating an OTU3 frame.

In addition, as shown in FIG. 5, it is also possible to set multiplexing paths to ODUs and OTUs of 2.5 Gbit/s and 40 Gbit/s respectively that are bit rates adopted in conventional optical transmission systems.

When the client signal is an Ethernet signal, since there is no client signal near 2.5 Gbit/s and 40 Gbit/s, there is no problem if no path is set for multiplexing into upper layers via this layer.

By providing means for performing above-mentioned multiplexing in the optical transmission system, each Ethernet signal can be transparently accommodated and multiplexed. The means can be configured by the rate adjusting unit, the management OH adding unit, and the multiplexing process unit in each embodiment. Also, as to the later-mentioned multiplexing shown in FIGS. 9-11, means for multiplexing can be configured by the rate adjusting unit, the management OH adding unit, and the multiplexing process unit.

Third Embodiment

Figure 6:
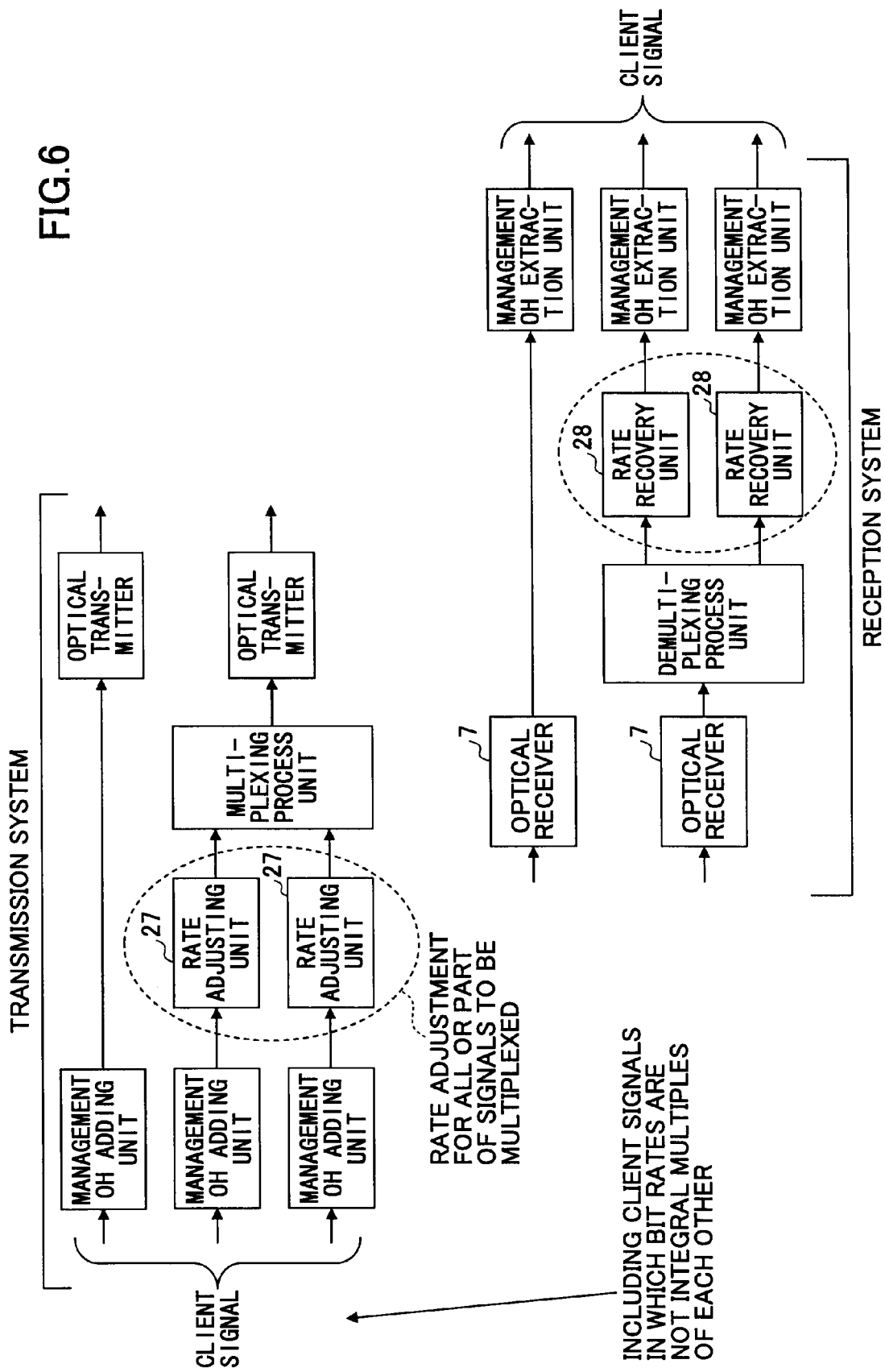
FIG. 6 is a configuration diagram of a third embodiment.

FIG. 6 shows a third embodiment. FIG. 6 shows a system configuration example for performing rate adjustment only when performing multiplexing. By performing rate adjustment using the rate adjusting unit 27 only when performing multiplexing without performing rate adjustment when multiplexing is not performed, the transmission bit rate can be kept low when multiplexing is not performed. Accordingly, required condition of operation speed for hardware implementation can be relaxed, so that the margin for transmission characteristics can be enlarged. The reception side is provided with a rate recovering unit 28 for recovering the rate of the signal for which demultiplexing process has been performed. In addition, FIG. 6 shows a configuration for performing rate adjustment after adding a management OH.

Fourth Embodiment

FIG. 7 shows a fourth embodiment. This embodiment shows a system configuration example for transmitting three kinds of client signals having bit rates different with each other. The bit rate of the client signal (2) is (M+α) times of the bit rate of the client signal (1), and the bit rate of the client signal (3) is (N+β) times of the bit rate of the client signal (2), wherein each of α and β is less than 1.

As to the client signal (1) of the lowest bit rate, after a management OH is added by the management OH adding unit 29, rate adjustment is performed by the rate adjusting unit 30 such that the bit rate of a signal obtained by adding a management OH to the faster client signal (2) using the management OH adding unit 29 becomes an integral multiple of the client signal (1), and multiplexing is performed by the multiplexing process unit 32. After a management OH for the multiplexed signal is added by the management OH adding unit 32, rate adjustment is performed by the rate adjusting unit 33 for the multiplexed signal to which the management OH is added such that the bit rate of a signal obtained by adding a management OH to the faster client signal (3) using the management OH adding unit 29 becomes an integral multiple of the multiplexed signal to which the management OH is added, and multiplexing is performed by the multiplexing process unit 34. A management OH is added also to the multiplexed signal by the management OH adding unit 35, so that the signal is transmitted by the optical transmitter 36 as an optical signal. In the reception side, termination of the management OH and rate recovery are performed for the optical signal received by the optical receiver 37 by the management OH extraction units 38, 41 and 44, demultiplexing process units 39 and 42, and the rate recovering units 40 and 43 in a reverse process of the transmission side.

By the above multiplexing method, low rate client signals can be transparently multiplexed including the management OH and can be transmitted.

Fifth Embodiment

Figure 8:
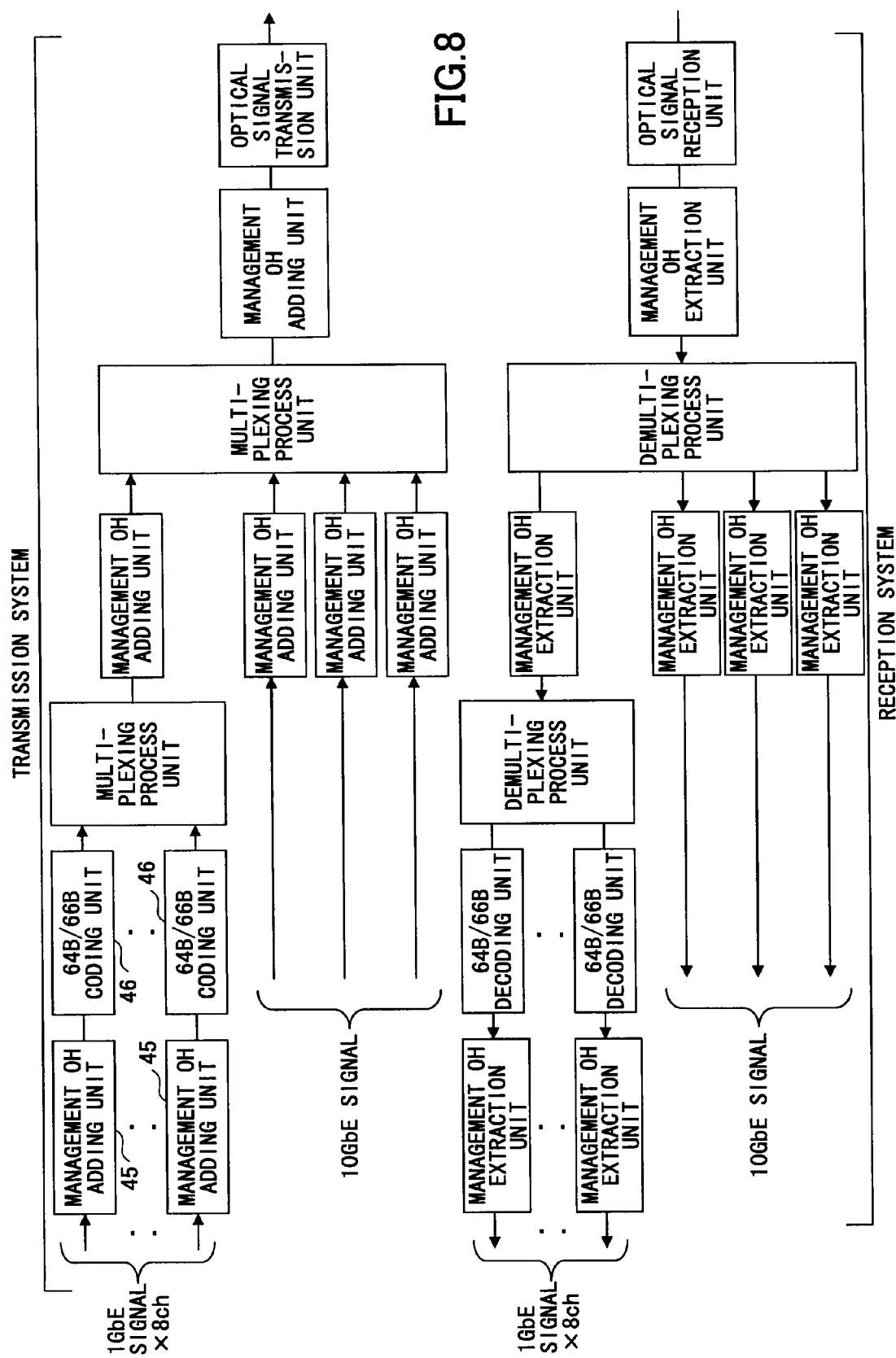
FIG. 8 is a configuration diagram of a fifth embodiment.
Figure 9:
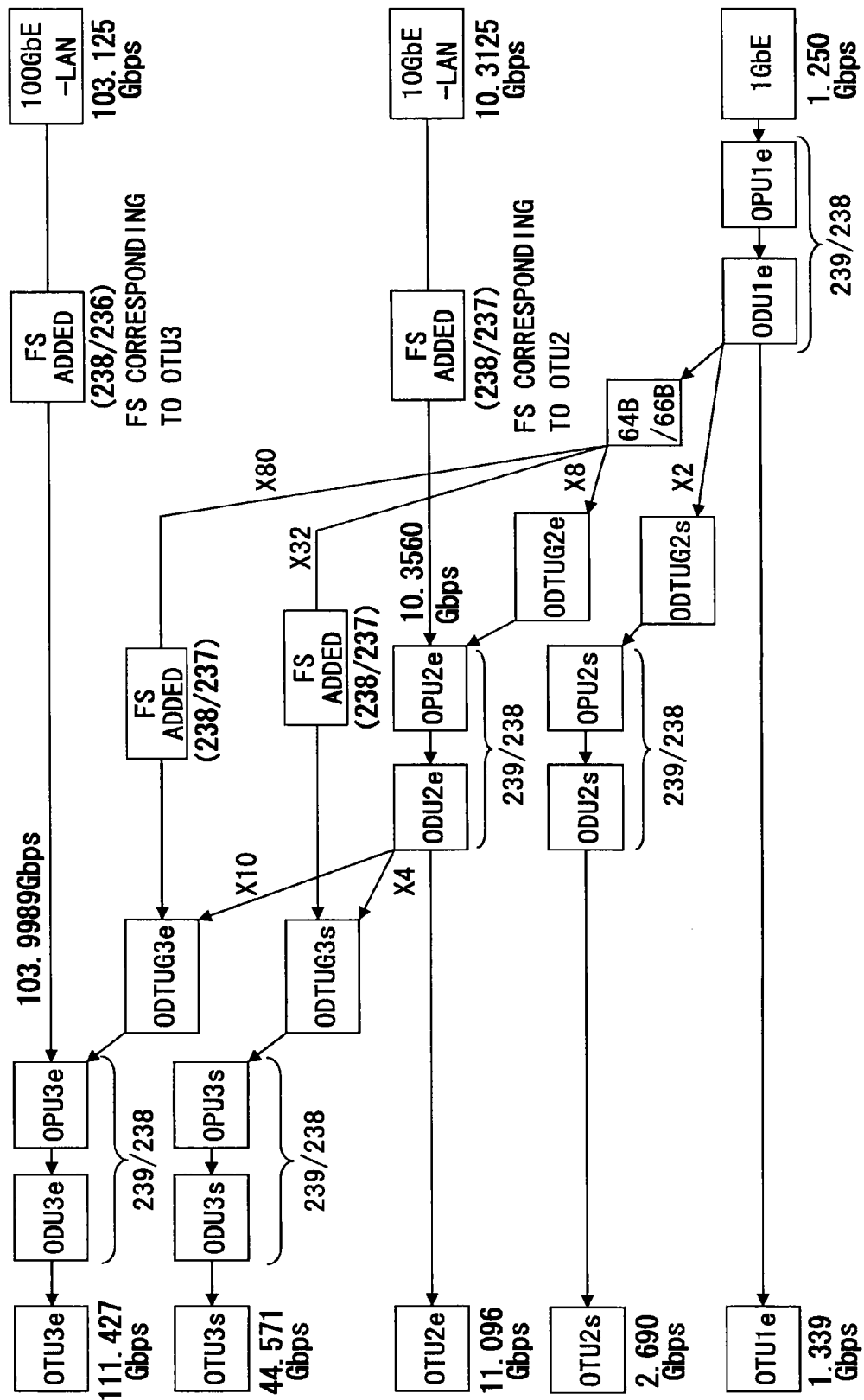
FIG. 9 is a diagram showing an example 1 of multiplexing paths including the fifth embodiment.
Figure 10:
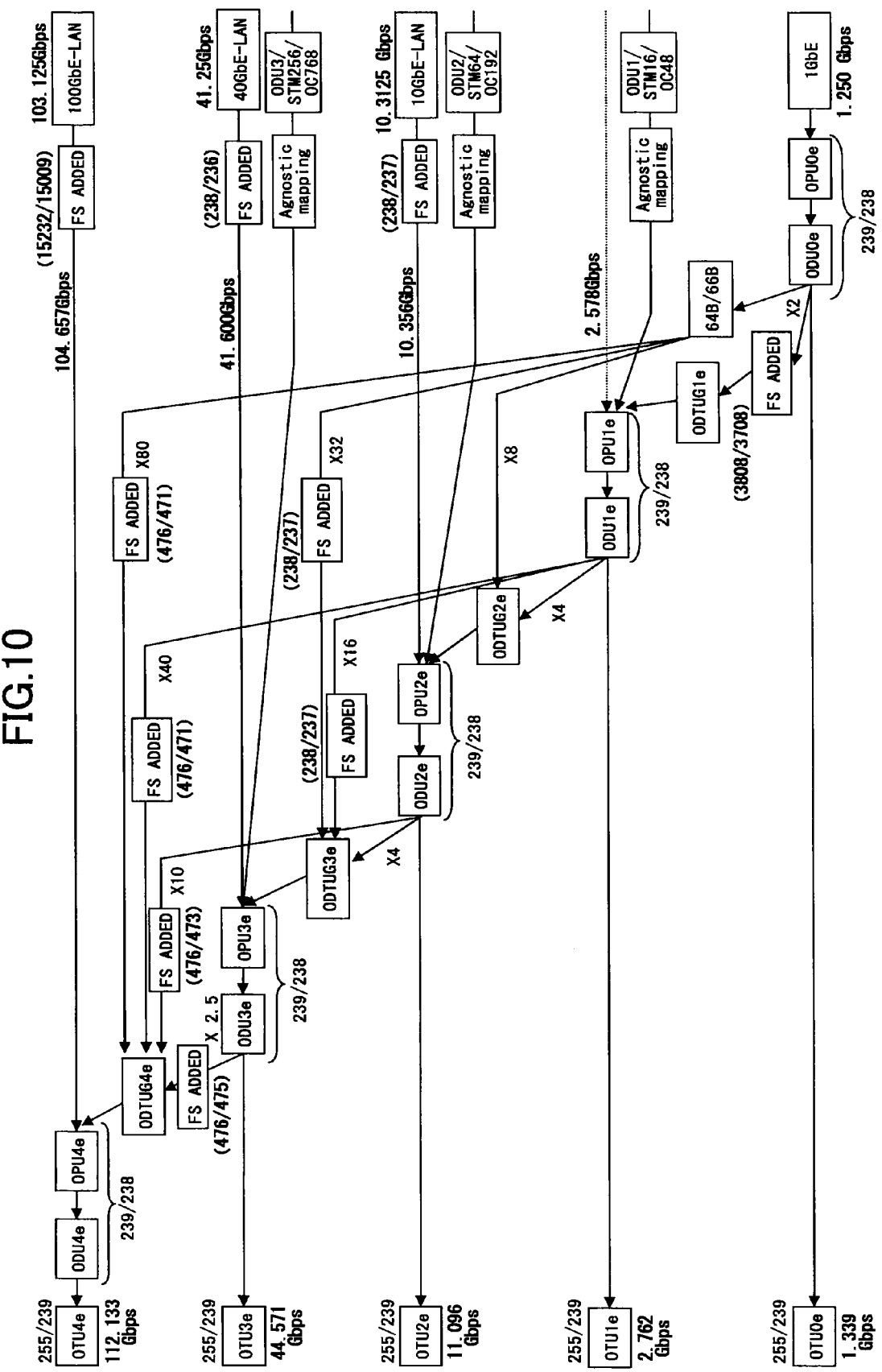
FIG. 10 is a diagram showing an example 2 of multiplexing paths including the fifth embodiment.
Figure 11:
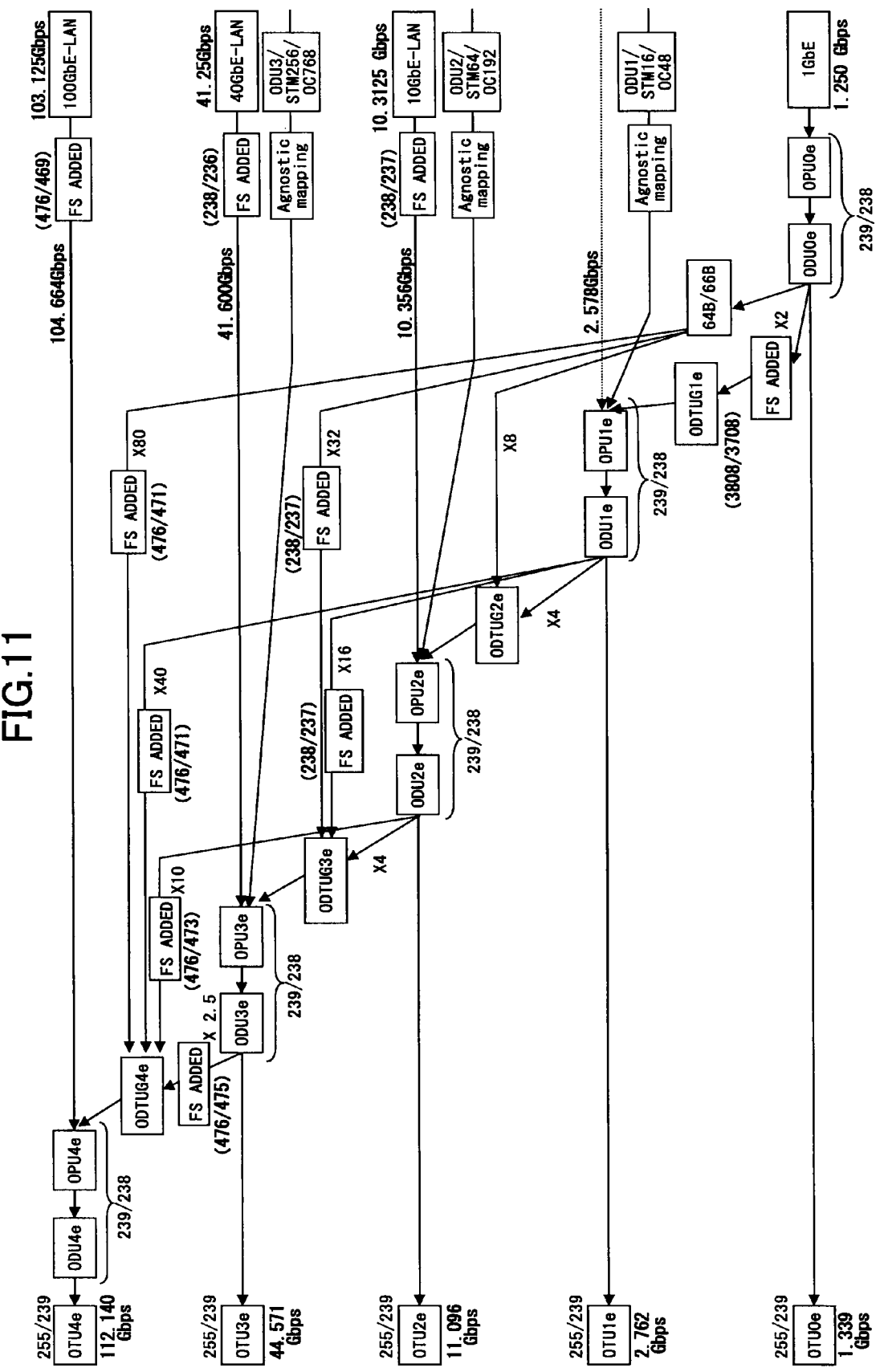
FIG. 11 is a diagram showing an example 3 of multiplexing paths including the fifth embodiment.

FIG. 8 shows a fifth embodiment. In addition, FIGS. 9-11 show examples 1-3 of multiplexing paths including the fifth embodiment. The fifth embodiment is different from the first embodiment in coding process performed for accommodating the 1 GbE signal. In the fifth embodiment, a configuration is adopted in which coding that is bit rate adjustment of the 1 GbE signal for multiplexing by the 64B/66B coding unit 46 in the transmission system is performed after adding the management OH by the management OH adding unit 45.

In the configuration of the example 1 of the multiplexing path shown in FIG. 9, since coding is performed only when performing multiplexing signals into a bit rate equal to or greater than that of a frame accommodating the 10 GbE signal, bit rate can be suppressed low when multiplexing is not performed or when performing multiplexing into 2.5 Gbit/s.

FIG. 10 is a figure showing an example 2 of multiplexing paths including the fifth embodiment.

A point in the example 2 different from the example 1 of the multiplexing paths of FIG. 9 is that 40 GbE client signal is considered.

The transmission system of the optical transmission system performing multiplexing shown in FIG. 10 generates a transmission frame complying with an OTU1 frame structure when directly accommodating the 1 Gigabit Ethernet signal. When directly accommodating a 10 Gigabit Ethernet signal, the transmission system changes the rate of the client signal by 238/237 times, accommodates the client signal into OPU2 in which the frame rate is converted, and generates a transmission frame complying with the OTU2 frame structure. When accommodating a client signal of 41.25 Gbit/s, the transmission system changes the rate of the client signal by 238/236 times, accommodates the client signal into OPU3 in which the frame rate is converted, and can generate a transmission frame complying with the OTU3 frame structure. In addition, when accommodating a client signal of 103.125 Gbit/s, the optical transmission system changes the rate of the client signal by 15232/15009 times, accommodates the client signal into OPU4, generates a transmission frame complying with the OTU4 frame structure of a bit rate of 112.133 Gbit/s.

By the way, in FIG. 10, OTU accommodating the 1 GbE client signal is described as OTU0e, OTU accommodating the 2.4 Gbit/s client signal is described as OTU1e, OTU accommodating the 10 GbE client signal is described as OTU2, OTU accommodating the 40 GbE client signal is described as OTU3e, and OTU accommodating the 100 GbE client signal is described as OTU4e.

In this example, in the client side, the MAC frame rate of the 40 GbE client signal is 40.0 Gbit/s, 64B/66B coding is performed in PCS (Physical Coding Sublayer), and the bit rate of 40 GbE PHY (Physical Sublayer) is 41.25 Gbit/s. In addition, in the example 1 of FIG. 9, OTU1e, OTU2e and OTU3e for 1 GbE, 10 GbE and 100 GbE clients are main body of optical transport layers, and OTU2s and OTU3s for 2.5 Gbit/s and 40 Gbit/s level clients are optional layers in optical transport layers. But, in this multiplexing example 2 shown in FIG. 10, client signals of 1 GbE and 2.5 Gbit/s levels and client signals of 10 GbE, 40 GbE and 100 GbE can be treated integrally.

In addition, as shown in FIG. 10, rate conversion of 15232/15009 using Fixed Stuff is performed for the 100 GbE client signal, so that the rate converted signal is accommodated into OPU4e. In addition, OPU4e can also accommodate path capacity corresponding to ODU3e×2.5 of 40 Gbit/s level. In addition, OPU4e can also multiplex and accommodates 10 ODU2es of 10 Gbit/s level, and OPU4e can also multiplex and accommodate 40 ODU1es of 2.5 Gbit/s level, and can also multiplex and accommodate 80 ODU0es of 1.25 Gbit/s level.

In the above-mentioned multiplexing and accommodating, a Fixed Stuff of 476/475 is added to the signal of 2.5×ODU3e so that rate adjustment is performed. Also, a Fixed Stuff of 476/471 is added to the signal of 40×ODU1e so that rate adjustment is performed, and a Fixed Stuff of 476/471 is added to the signal of 80×ODU0e so that rate adjustment is performed. Different from the case of multiplexing by exponent of 2, when adding OH in ODTUG4e, there is a case in which a byte for executing justification for multiplexing is overwritten onto the region of the Fixed Stuff.

In addition, as shown in FIG. 10, the optical transmission system of the present embodiment can be configured so as to accommodate, as client signals, one or a plurality of signals of the SONET signals, the SDH signals and the ODU signals. This applies also to the case of FIG. 11 similarly.

FIG. 11 is a figure showing an example 3 of multiplexing paths including the fifth embodiment. FIG. 11 is different from FIG. 10 in the method of inserting Fixed Stuff when accommodating the 100 GbE client signal into OPU4e, wherein the Fixed Stuff, which is 15232/15009 in FIG. 10, is changed to 476/469 in FIG. 11. An OTN frame is configured as a frame structure of 4 columns, and since same stuffing can be performed for each of the 4 columns in the scheme of 476/469 Fixed Stuff, there is a possibility to simplify the circuit configuration in implementation by using the 476/469 Fixed Stuff shown in FIG. 11.

Example of Frequency Synchronization

Figure 12A:
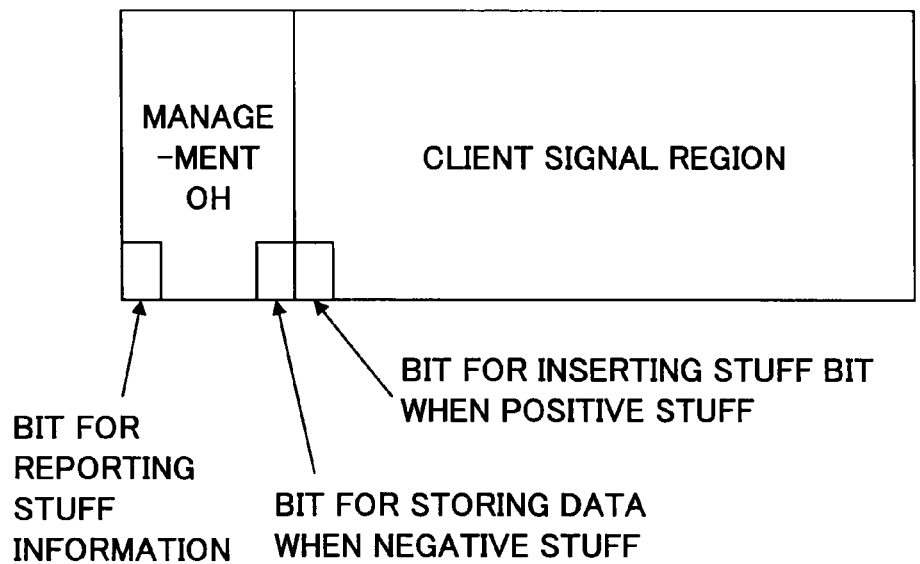
FIG. 12A is a diagram showing a frequency synchronization operation example in the first-fifth embodiments.
Figure 12B:
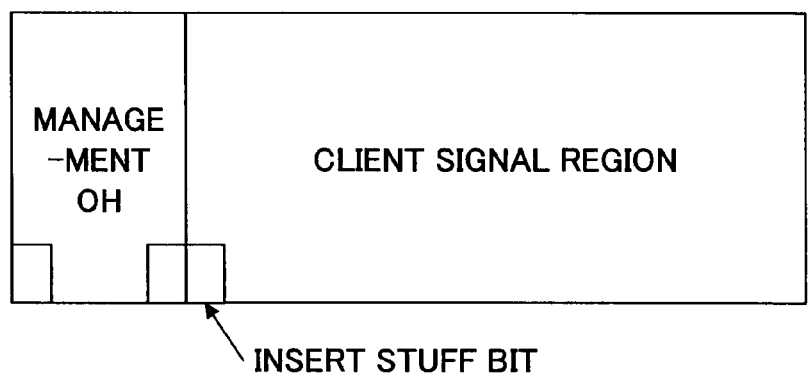
FIG. 12B is a diagram showing a frequency synchronization operation example in the first-fifth embodiments.
Figure 12C:
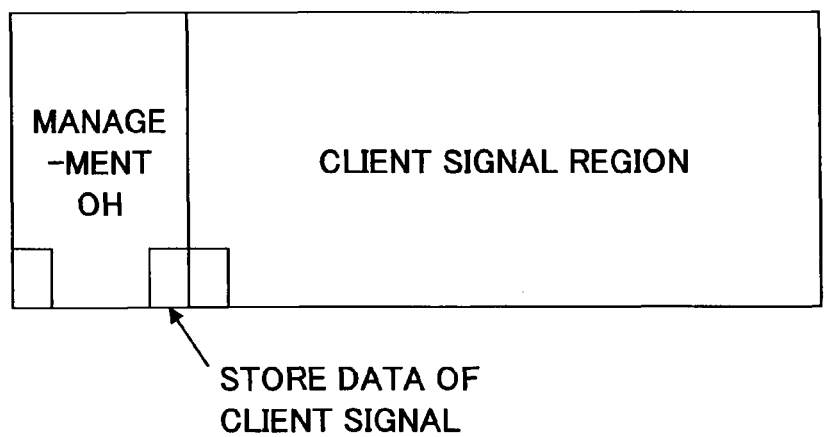
FIG. 12C is a diagram showing a frequency synchronization operation example in the first-fifth embodiments.

Operation examples of frequency synchronization in the first-fifth embodiments are shown in FIGS. 12A-12C. Bit rates of the client signals vary to some extent. For example, as to the case of Ethernet signals, the variation of the bit rates is ±100 ppm. Unless the variation of the bit rates is adjusted so as to perform frequency synchronization, time-division multiplexing cannot be performed.

When accommodating a client signal, the management OH adding unit in the transmission system adds a management overhead to form a frame. At that time, as shown in FIG. 12A, a stuff information notification bit used for frequency synchronization, and a bit for storing data when negative stuff are defined in the management overhead, and a bit for inserting stuff bit when positive stuff is defined in a client signal accommodation region.

When a management OH adding unit or other function unit that is not shown in the figure in the optical transmission system in each embodiment detects that the bit rate of the client signal is lower than the bit rate of the client signal region of the accommodating frame, the management OH adding unit inserts a stuff bit in the positive stuff byte inserting bit as shown in FIG. 12B. When the bit rate of the client signal is higher, the management OH adding unit inserts client signal data in the data storing bit for negative stuff. In the cases shown in FIGS. 12B and 12C, the stuff information notification bit includes amount, place and the like of the bits for stuff. According to these operations, frequency synchronization can be realized. In addition, in each embodiment, rate adjustment is performed among a plurality of signals such that bit rates agrees with each other or bit rates becomes integral multiples or integral submultiples of each other within a permissible range of frequency synchronization.

Assuming that the client signal is the Ethernet signal, and variation of bit rate in the network side is similar to the variation of the bit rate of the Ethernet signal, the difference of bit rates becomes ±200 ppm at the maximum. Thus, by defining positive or negative stuff process equal to or greater than 1 bit per 5000 bits of client signals, it becomes possible to accommodate and multiplex Ethernet signals without bit slip.

INDUSTRIAL APPLICABILITY

According to the embodiments of the present invention, an optical transmission system that can efficiently accommodate, multiplex and transmit a plurality of client signals such as 1 GbE and 10 GbE in which bit rates are not integral multiples of each other can be realized. Thus, service quality for network users can be improved, and efficient network operation can be realized for network operators.

The present invention is not limited to the specifically disclosed embodiments, and variations and modifications may be made without departing from the scope of the present invention.

The present international application claims priority based on Japanese patent application No. 2006-256783, filed in the JPO on Sep. 22, 2006, and the entire contents of the application are incorporated herein by reference.

The invention claimed is:

1. A multiplexing transmission system for adding a management overhead to a client signal, and transparently accommodating or multiplexing the client signal for transmission, wherein the multiplexing transmission system comprises:

means for receiving a plurality of client signals of different bit rates including a client signal of a bit rate that is not an integral multiple or an integral submultiple of a bit rate of another client signal, the client signals including a 1 Gigabit Ethernet signal and a 10 Gigabit Ethernet signal; and a rate adjustment unit configured to perform rate adjustment for a part or all of the plurality of client signals such that the bit rate of each client signal becomes an integral multiple or integral submultiple of the bit rate of the another client signal, wherein the rate adjustment is configured to perform 64B/66B coding of the 1 Gigabit Ethernet signal as the rate adjustment.

2. The multiplexing transmission system as claimed in claim 1, wherein the rate adjustment unit is configured to perform the rate adjustment before adding the management overhead.

3. The multiplexing transmission system as claimed in claim 1, wherein the rate adjustment unit is configured to perform the rate adjustment for part of or all signals to which the management overhead is added when multiplexing the signals to which the management overhead is added.

4. The multiplexing transmission system as claimed in claim 3, wherein, when multiplexing low rate client signals into a high rate client signal of a higher bit rate, the rate adjustment unit performs rate adjustment such that a bit rate of a multiplexed signal obtained by multiplexing signals each being the low rate client signal to which a management overhead is added agrees with a bit rate of a signal obtained by adding a management overhead to the high rate client signal.

5. The multiplexing transmission system as claimed in claim 1, wherein the multiplexing transmission system increases the management overhead added to a high rate client signal by the amount of the management overhead added to low rate client signals.

6. The multiplexing transmission system as claimed in claim 1, wherein the means for receiving receives, as the client signals, client signals of a bit rate of 103.125 Gbit/s.

7. The multiplexing transmission system as claimed in claim 1, wherein the means for receiving receives, as the client signals, client signals of a bit rate of 41.25 Gbit/s.

8. The multiplexing transmission system as claimed in claim 1, wherein the multiplexing transmission system generates, as a transmission frame including the management overhead, a transmission frame complying with an OTU1 frame structure when directly accommodating the 1 Gigabit Ethernet signal,
generates a transmission frame complying with an OTU2 frame structure when directly accommodating the 10 Gigabit Ethernet signal, and
generates a transmission frame of a bit rate of 111.4274364 Gbit/s complying with an OTU3 frame structure when directly accommodating a client signal of 103.125 Gbit/s.

9. The multiplexing transmission system as claimed in claim 8, wherein the multiplexing transmission system includes means for multiplexing the 1 Gigabit Ethernet signal and the 10 Gigabit Ethernet signal into transmission frames of a higher bit rate, respectively.

10. The multiplexing transmission system as claimed in claim 1, wherein the multiplexing transmission system generates, as a transmission frame including the management overhead, a transmission frame complying with an OTU1 frame structure when directly receiving the 1 Gigabit Ethernet signal,
when directly receiving the 10 Gigabit Ethernet signal as the client signal, the multiplexing transmission system accommodates the client signal into OPU2 after rate adjustment of the client signal by 238/237 times to generate a transmission frame complying with an OTU2 frame structure,
when receiving a client signal of 41.25 Gbit/s, the multiplexing transmission system accommodates the client signal into OPU3 after rate adjustment of the client signal by 238/236 times to generate a transmission frame complying with an OTU3 frame structure, and
when receiving a client signal of 103.125 Gbit/s, the multiplexing transmission system accommodates the client signal into an OPU frame after rate adjustment of the client signal by 15232/15009 times to generate a transmission frame of a bit rate of 112.133 Gbit/s complying with an OTU frame structure.

11. The multiplexing transmission system as claimed in claim 1, wherein the multiplexing transmission system generates, as a transmission frame including the management overhead, a transmission frame complying with an OTU1 frame structure when directly receiving the 1 Gigabit Ethernet signal,
when receiving the 10 Gigabit Ethernet signal as the client signal, the multiplexing transmission system accommodates the client signal into OPU2 after rate adjustment of the client signal by 238/237 times to generate a transmission frame complying with an OTU2 frame structure,
when receiving a client signal of 41.25 Gbit/s, the multiplexing transmission system accommodates the client signal into OPU3 after rate adjustment of the client signal by 238/236 times to generate a transmission frame complying with an OTU3 frame structure, and
when receiving a client signal of 103.125 Gbit/s, the multiplexing transmission system accommodates the client signal into an OPU frame after rate adjustment of the client signal by 476/469 times to generate a transmission frame of a bit rate of 112.140 Gbit/s complying with an OTU frame structure.

12. The multiplexing transmission system as claimed in claim 1, wherein the multiplexing transmission system receives SONET/SDH signals as the client signals.

13. The multiplexing transmission system as claimed in claim 1, wherein the multiplexing transmission system receives ODU signals as the client signals.

14. The multiplexing transmission system as claimed in claim 1, wherein the multiplexing transmission system performs frequency synchronization for the client signal by defining a bit for stuff information notification and a bit for storing data when negative stuff in the management overhead, and defining a bit for inserting a stuff bit when positive stuff in a client signal accommodating region.

15. The multiplexing transmission system as claimed in claim 14, wherein the rate adjustment unit performs rate adjustment such that bit rates agree with each other or bit rates become integral multiples or integral submultiples of each other within a permitted range of the frequency synchronization.

16. A multiplexing transmission method for adding a management overhead to a client signal, and transparently accommodating or multiplexing the client signal for transmission, comprising:
receiving a plurality of client signals of different bit rates including a client signal of a bit rate that is not an integral multiple or an integral submultiple of a bit rate of another client signal, the client signals including a 1 Gigabit Ethernet signal and a 10 Gigabit Ethernet signal; and
performing rate adjustment for a part or all of the plurality of client signals such that the bit rate of each client signal becomes an integral multiple or integral submultiple of the bit rate of the another client signal, wherein the performing step includes performing 64B/66B coding of the 1 Gigabit Ethernet signal.

17. The multiplexing method of claim 16, wherein the performing step comprises:

performing the rate adjustment for part of or all signals to which the management overhead is added when multiplexing the signals to which the management overhead is added.

18. The multiplexing method of claim 16, further comprising:

increasing the management overhead added to a high rate client signal by an amount of a management overhead added to low rate client signals.

19. A multiplexing transmission system for adding a management overhead to a client signal, and transparently accommodating or multiplexing the client signal for transmission, wherein the multiplexing transmission system comprises:

means for receiving a plurality of client signals of different bit rates including a client signal of a bit rate that is not an integral multiple or an integral submultiple of a bit rate of another client signal; and a rate adjustment unit configured to perform rate adjustment for a part or all of the plurality of client signals such that the bit rate of each client signal becomes an integral multiple or integral submultiple of the bit rate of the another client signal, wherein the rate adjustment unit is configured to perform the rate adjustment for part of or all signals to which the management overhead is added when multiplexing the signals to which the management overhead is added.

20. A multiplexing transmission system for adding a management overhead to a client signal, and transparently accommodating or multiplexing the client signal for transmission, wherein the multiplexing transmission system comprises:

means for receiving a plurality of client signals of different bit rates including a client signal of a bit rate that is not an integral multiple or an integral submultiple of a bit rate of another client signal; and a rate adjustment unit configured to perform rate adjustment for a part or all of the plurality of client signals such that the bit rate of each client signal becomes an integral multiple or integral submultiple of the bit rate of the another client signal, wherein the multiplexing transmission system increases the management overhead added to a high rate client signal by an amount of a management overhead added to low rate client signals.

\* \* \* \* \*